Oct. 1, 1929.  D. I. MITCHELL  1,729,648
CORN HARVESTER
Filed Aug. 13, 1923   3 Sheets-Sheet 3

Inventor
D. I. Mitchell
By Jacobi & Jacobi
Attorneys

Patented Oct. 1, 1929

1,729,648

UNITED STATES PATENT OFFICE

DALE I. MITCHELL, OF TALBOT, INDIANA

CORN HARVESTER

Application filed August 13, 1923. Serial No. 657,106.

This invention relates to a corn harvester and more particularly to one designed to be used in conjunction with the gathering and husking of corn and delivering the husked corn into a suitable wagon traveling along with the machine.

Another important object of the invention is to provide a corn harvester of the above mentioned character, which is adapted to move along a corn field and will act upon two rows of corn simultaneously.

Another important object of the invention is to provide a corn harvester of the above mentioned character, wherein all of the elements of the machine are adapted to be operated by a suitable tractor and to which the same are connected.

A still further object of the invention is to provide a corn harvester of the above mentioned character, which will enable corn to be more readily and easily harvested and will not require the necessity of providing a number of independent machines and men to operate the same in order to produce the necessary results.

A further object of the invention is to provide a corn harvester which is simple in construction, inexpensive, strong, durable, and further well adapted for the purposes for which it is designed.

Other objects and advantages of this invention will become apparent during the course of the following description.

In the accompanying drawings forming a part of this specification and in which like numerals designate like parts throughout the same:—

Figure 6 is a detail sectional view on the line 6—6 of Figure 1.

Figure 1:
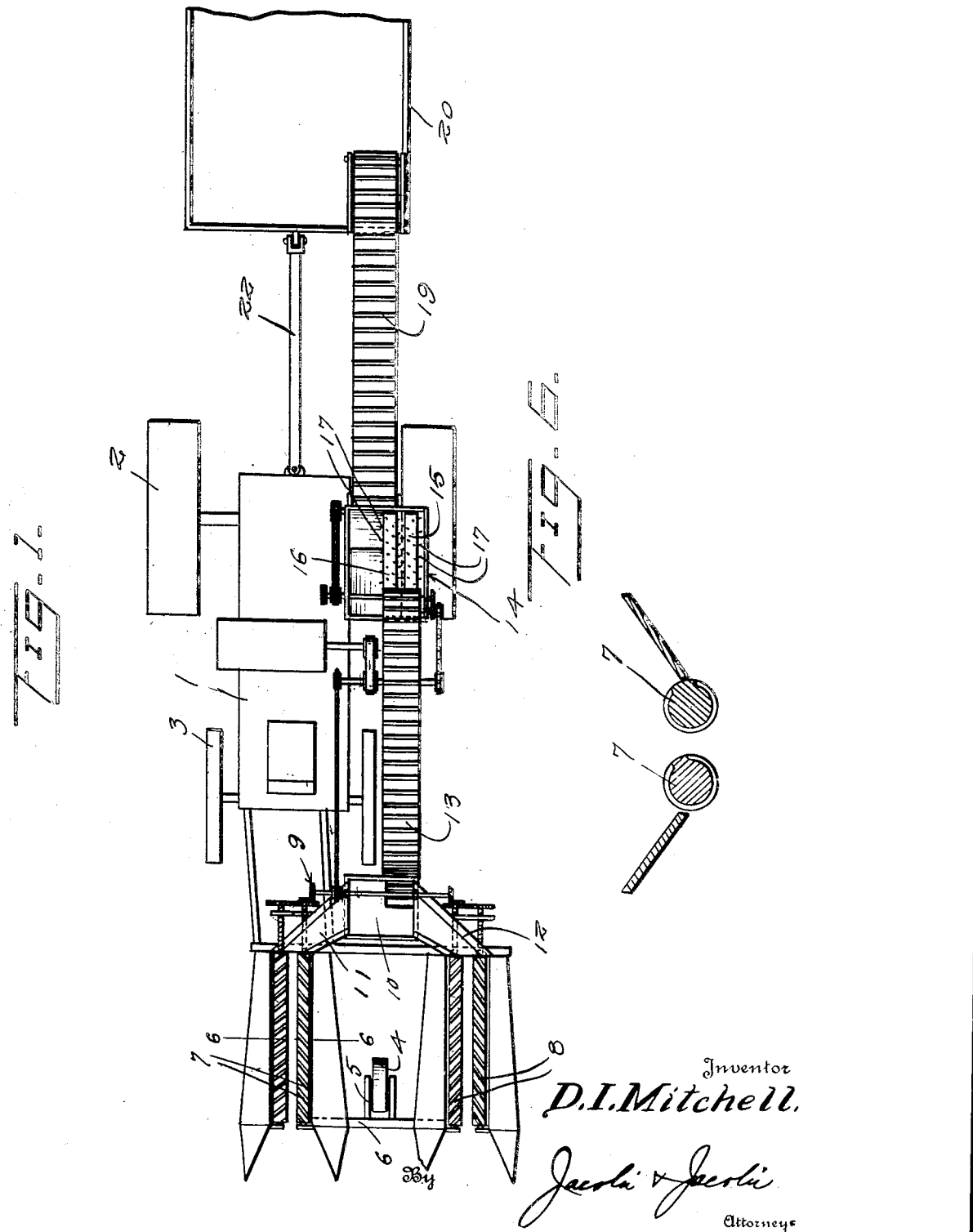
Figure 1 is a top plan view of the invention.
Figure 2:
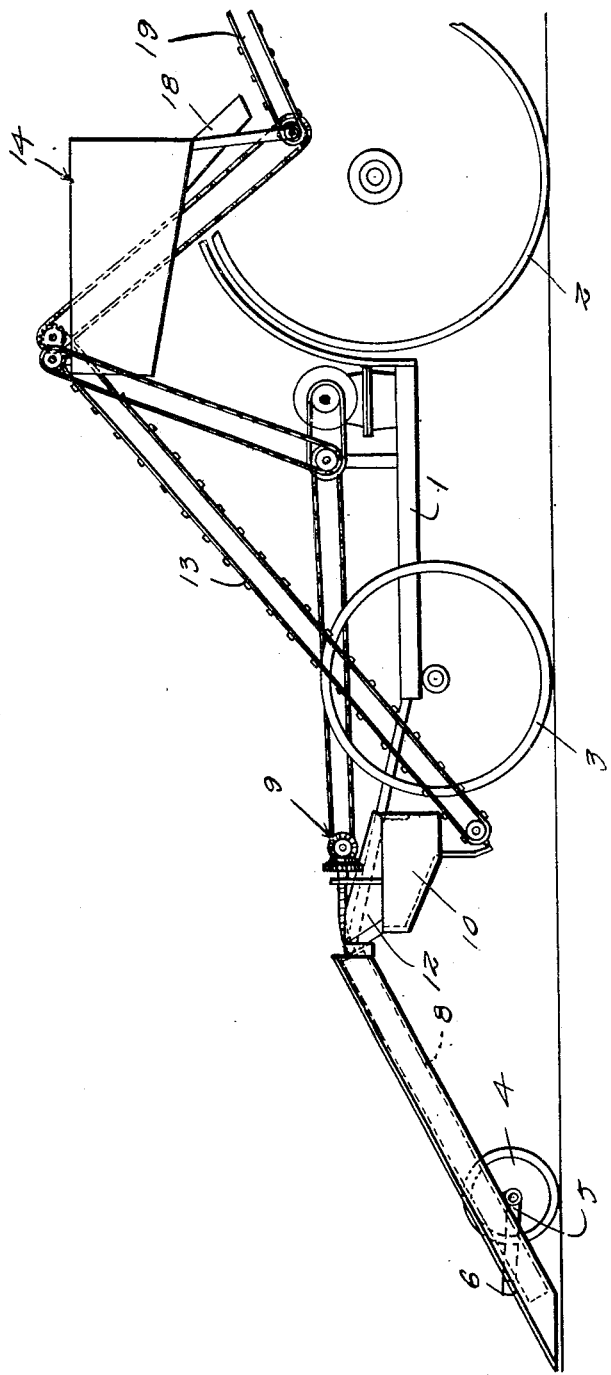
Figure 2 is a side elevation on a larger scale showing the relative arrangement of the several parts of my invention with the exception of the wagon body.
Figure 3:
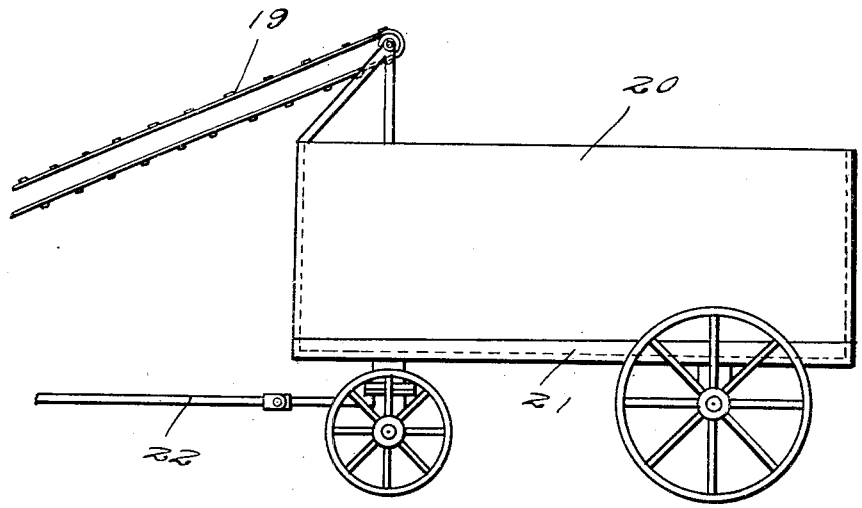
Figure 3 is a side elevation of the wagon body.
Figure 4:
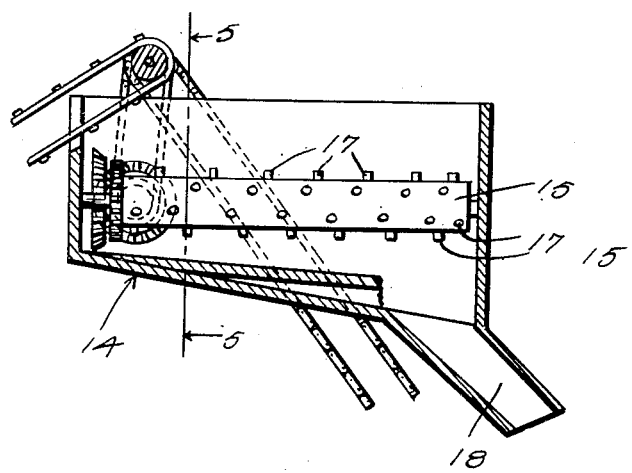
Figure 4 is a detail sectional view showing the husking mechanism taken on line 4—4 of Figure 5.
Figure 5:
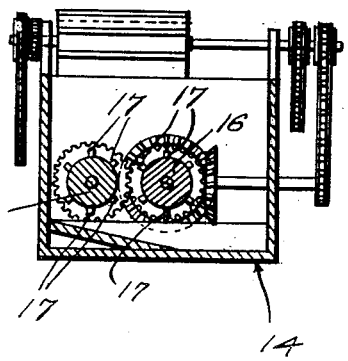
Figure 5 is a transverse sectional view on the line 5—5 of Figure 4.

In the drawings wherein for the purpose of illustration is shown the preferred embodiment of my invention, the numeral 1 designates generally a tractor which is of the usual construction and which is provided with the traction wheels 2 at the rear thereof and the steering wheels at the forward end thereof. A wheel 4 is journaled in the frame 5 which carries a beam 6. The purpose of this transverse extending beam 6 is to provide a means for supporting a pair of snapping rollers designated by the numerals 7 and 8 respectively. These snapping rollers 7 and 8 are of the usual construction as is well known in the art and it is not thought necessary to go into detail as to the construction of the same.

For the purpose of rotating these snapping rollers 7 and 8 respectively a suitable driving means such as is shown at 9 in the drawings is connected to the drive shaft of the tractor whereby the snapping rollers are rotated in the well known manner.

A hopper 10 is located at the rear of and between the sets of rolls 7 and 8. This hopper 10 is adapted to communicate with the snapping rollers 7 and 8 by means of the conveyors 11 and 12, respectively. The hopper 10 furthermore communicates with the forward end of an upwardly inclined conveyor 13 and this conveyor 13 is adapted to extend upwardly on the tractor frame 1 so as to have its upper end in communication with a suitable corn husker designated generally by the numeral 14. This corn husker 14 includes a pair of oppositely rotating rollers 15 and 16 and upon which are fingers 17.

The conveyor 13 and the corn husker 14 are also driven by suitable driving means with the tractor engine and adapted to operate simultaneously with the rotation of the snapping rollers 7 and 8.

The rear portion of the corn husker 14 is provided with a discharge spout or outlet 18 and the free end of which communicates with the forward end of an endless conveyor 19 which is also suitably supported upon the rear portion of the tractor frame 1 and which has its opposite free end inclined upwardly 1( and extending over the wagon box 20 of the wheel wagon frame 21. This wagon 21 is connected to the rear of the tractor or frame 1 by any suitable tow bar such as is shown at 22 in the drawings.

In operation, the tractor 1 will move along between two rows of growing corn and upon starting the rotation of the snapping rollers 7 and 8, the latter will snap the ears of corn from the stalks and cause the same to be conveyed upwardly to the hopper 10 where the same is then fed by means of the conveyor means 13 to the corn husker 14 where the corn husking rollers 15 and 16 will husk the corn in the well known manner and the shucked corn will then be conveyed through the medium of the spout 18 and the conveyor 19 into the wagon box or receptacle 20 carried by the rear tractor frame. In this manner it will be seen that considerable time and labor will be saved in harvesting corn and furthermore the arrangement of the relative parts are such as to prevent the tractor from damaging the adjacent rows of corn while in the progress of gathering two rows of corn. The simplicity in which my device is constructed enables the same to readily and quickly produce the same results as heretofore required the employment of a considerable number of men and also of a number of independent machines such as a machine for snapping and husking the corn and additional means for conveying the same from the snapping rollers to the corn husker and furthermore having to employ a complicated frame structure in order to discharge the husked corn into a suitable receptacle.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

A corn harvester attachment adapted to be used upon a tractor comprising a frame adapted to be connected with the forward portion of the tractor and extending transversely across the tractor, said frame having one side edge located in alignment with the intermediate portion of the tractor and the opposite side edge located beyond one side of the tractor, a ground engaging wheel journaled at the forward portion of the frame and located midway between the side edges thereof, a plurality of sets of snapping rolls mounted upon the frame and spaced from each other, and disposed along the side edges thereof, a hopper mounted upon the frame behind the sets of snapping rolls and located midway between the side edges of the frame, and adapted to receive ears from both sets of snapping rolls, a set of husking rolls mounted upon the tractor, a conveyor extending along the side of the tractor and adapted to convey ears from the hopper to the husking rolls and an elevator extending rearwardly from the husking rolls.

In witness whereof I affix my signature.

DALE I. MITCHELL.